United States Patent
Sivakumar et al.

(10) Patent No.: US 12,154,296 B2
(45) Date of Patent: Nov. 26, 2024

(54) METHOD AND SYSTEM FOR AUTOMATIC EXTRINSIC CALIBRATION OF SPAD LiDAR AND CAMERA PAIRS

(71) Applicant: DENSO CORPORATION, Aichi (JP)

(72) Inventors: Prasanna Sivakumar, Pittsburgh, PA (US); Shawn Hunt, Bethel Park, PA (US)

(73) Assignee: DENSO CORPORATION, Kariya (JP)

( * ) Notice: Subject to any disclaimer, the term of this patent is extended or adjusted under 35 U.S.C. 154(b) by 462 days.

(21) Appl. No.: 17/708,741

(22) Filed: Mar. 30, 2022

(65) Prior Publication Data

US 2023/0115660 A1   Apr. 13, 2023

Related U.S. Application Data

(60) Provisional application No. 63/262,209, filed on Oct. 7, 2021.

(51) Int. Cl.
*G06V 10/40* (2022.01)
*G01S 17/86* (2020.01)
(Continued)

(52) U.S. Cl.
CPC ............... *G06T 7/80* (2017.01); *G01S 17/86* (2020.01); *G06V 10/40* (2022.01); *G06V 10/74* (2022.01);
(Continued)

(58) Field of Classification Search
CPC ............ G06T 7/80; G06T 2207/10028; G06T 2207/10016; G06T 2207/10024;
(Continued)

(56) References Cited

U.S. PATENT DOCUMENTS 9,201,424 B1   12/2015   Ogale
10,176,596 B1   1/2019   Mou
(Continued)

OTHER PUBLICATIONS

Kim et al., Extrinsic Calibration between Camera and LiDAR Sensors by Matching Multiple 3D Planes, Sensors 2020, Dec. 20, 2019, 17 pages, vol. 20(1), 52, MDPI, https://doi.org/10.3390/s20010052.

*Primary Examiner* — Chuong A Ngo
(74) *Attorney, Agent, or Firm* — Harness, Dickey & Pierce, P.L.C.

(57) ABSTRACT

A method of calibrating a camera sensor and a SPAD LiDAR includes extracting identified features in each of a selected camera image and an ambient-intensity (A-I) image, generating a set of keypoints based on the identified features extracted for each of the images to provide a set of 2D camera keypoint locations and a set of 2D A-I keypoint locations, determining matched keypoints based on the set of 2D A-I keypoint locations and the set of 2D camera keypoint locations to provide a set of 2D A-I matched pixel locations and a set of 2D camera matched pixel locations, interpolating a 3D point cloud data with the set of 2D A-I matched pixel locations to obtain a set of 3D LiDAR matched pixel locations, and determining and storing extrinsic parameters to transform the set of 3D LiDAR matched pixel locations with the set of 2D camera matched pixel locations.

20 Claims, 8 Drawing Sheets

(51) Int. Cl.
*G06T 7/80* (2017.01)
*G06V 10/74* (2022.01)
*H04N 17/00* (2006.01)
*H04N 23/60* (2023.01)

(52) U.S. Cl.
CPC ......... *H04N 17/002* (2013.01); *H04N 23/665* (2023.01); *G06T 2207/10028* (2013.01)

(58) Field of Classification Search
CPC ........... G06T 2207/30252; G01S 17/86; G01S 7/4972; G01S 17/89; G06V 10/40; G06V 10/74; G06V 10/803; G06V 10/82; H04N 17/002; H04N 23/665
See application file for complete search history.

(56) References Cited

U.S. PATENT DOCUMENTS

| | | |
|---|---|---|
| 10,841,483 B1 | 11/2020 | Hunt |
| 2007/0031064 A1 | 2/2007 | Zhao et al. |
| 2014/0240690 A1 | 8/2014 | Newman et al. |
| 2015/0317781 A1 | 11/2015 | Napier et al. |
| 2020/0033456 A1* | 1/2020 | Wang .................. G04F 10/005 |
| 2023/0015889 A1* | 1/2023 | Cullen .................... G06T 7/80 |

* cited by examiner

METHOD AND SYSTEM FOR AUTOMATIC EXTRINSIC CALIBRATION OF SPAD LiDAR AND CAMERA PAIRS

CROSS-REFERENCE TO RELATED APPLICATION

This application is a U.S. Patent Application, which claims priority to, and the benefit of U.S. Provisional Patent Application No. 63/262,209 filed on Oct. 7, 2021. The disclosure of the above applications is incorporated herein by reference.

FIELD

The present disclosure relates to calibrating a pair of vehicle image sensor pair including a camera and light detection and ranging (LiDAR) sensor.

BACKGROUND

The statements in this section merely provide background information related to the present disclosure and may not constitute prior art.

Calibration of extrinsic parameters is the process of identifying one or more extrinsic parameters or, in other words, a relative pose between a pair of sensors to define a relationship between two coordinate systems. Generally, the extrinsic parameters are defined as a rotation matrix and a translation vector between the two coordinate systems.

In an example application, LiDAR sensors and camera sensors are two common sensors used together in self-driving vehicles. Precise estimation of the relative pose between these two sensors is important for accurate autonomous control of the vehicle. In general, a pose is referred to as a position and orientation of a camera sensor and a LiDAR sensor relative to one another with respect to a reference coordinate system and can be provided as extrinsic parameters of the camera sensor and LiDAR sensor.

Unfortunately, the existing tools for calibrating the extrinsic parameters between a camera and LiDAR sensors (i.e., camera-LiDAR pair) rely on pre-defined calibration patterns (e.g. a checkerboard pattern) and unique codes. In addition, some current calibration processes can be a laborious process that can require significant amount of time to set-up and run, and can employ a significant amount of resources such as a controlled environment.

Issues related to calibrating extrinsic parameters of a camera and a LiDAR-type sensors pair and other issues related to automatically calibrating extrinsic parameters is discussed in the present disclosure.

SUMMARY

This section provides a general summary of the disclosure and is not a comprehensive disclosure of its full scope or all of its features.

In one form, the present disclosure provides a method of calibrating an image sensor pair including a camera sensor and a single photon avalanche diode (SPAD) light detection and range (LiDAR) sensor provided, the camera sensor and the SPAD LiDAR sensor being at a vehicle that includes extracting one or more identified features in each of a selected camera image and an ambient-intensity (A-I) image. The selected camera image is provided by the camera sensor and the A-I image is provided by the SPAD LiDAR sensor. The method includes generating a set of keypoints based on the one or more identified features extracted for each of the selected camera image and the A-I image. Each keypoint of the set of keypoints provides a pixel location and an image feature identified from among the one or more identified features at the pixel location for a respective image. The set of keypoints for the selected camera image is referred to as a set of two-dimensional (2D) camera keypoint locations and the set of keypoints for the A-I image is referred to as a set of 2D A-I keypoint locations. The method includes determining one or more matched keypoints based on the set of 2D A-I keypoint locations and the set of 2D camera keypoint locations to provide a set of 2D A-I matched pixel locations and a set of 2D camera matched pixel locations. The set of 2D A-I matched pixel locations and the set of 2D camera matched pixel locations provide a pixel location of the one or more matched keypoints, respectively. The method includes interpolating a three-dimensional (3D) point cloud data with the set of 2D A-I matched pixel locations to obtain a set of 3D LiDAR matched pixel locations based on a 2D-3D correlation data, wherein the 3D point cloud data is provided by the SPAD LiDAR. The method includes determining and storing a set of extrinsic parameters to transform the set of 3D LiDAR matched pixel locations with the set of 2D camera matched pixel locations based on a pixel distance threshold.

In one form, the method further includes having the camera sensor and the SPAD LiDAR sensor synchronized to a common reference clock.

In another form, the method further includes pairing the selected camera image with the A-I image based on a camera timestamp associated with the selected camera image and a SPAD LiDAR timestamp associated with the A-I image.

In other forms, pairing the selected camera image with the A-I image further includes: comparing camera timestamps of a plurality of camera images from the camera sensor with the SPAD LiDAR timestamp of the A-I image; and selecting, from the plurality of camera images, a camera image having a camera timestamp that is closest in time to the SPAD LiDAR timestamp associated with the A-I image, as the selected camera image.

In one form, the A-I image includes an ambient image and an intensity image, and the set of 2D A-I keypoint locations includes one or more keypoints for each of the ambient image and the intensity image.

In another form, determining the set of extrinsic parameters further includes: determining whether a keypoint pixel offset is less than a pixel distance threshold, wherein the keypoint pixel offset is indicative of a distance between pixel locations of a selected matched keypoint provided in the set of 3D LiDAR matched pixel locations and the set of 2D camera matched pixel locations; and obtaining an updated camera image and an updated A-I image in response to the keypoint pixel offset being greater than the pixel distance threshold. The extrinsic parameters are stored in response to the keypoint pixel offset being less than the pixel distance threshold.

In some forms, the vehicle includes a plurality of camera sensors and a plurality of SPAD LiDAR sensors. The method further includes: determining whether a field of view of a selected camera from among the plurality of cameras overlaps with a field of view of a selected SPAD LiDAR from among the plurality of SPAD LiDAR. The method further includes providing the selected camera and the selected SPAD LiDAR as the image sensor pair to be calibrated in response to the field of view of the selected camera and the field of view of the SPAD LiDAR overlapping.

In one form, the one or more identified features extracted are indicative of a shaped edge, a shaped contour, a predetermined classification of known objects, a corner of an object, or a combination thereof.

In another form, the A-I image includes an ambient image and an intensity image, and the one or more identified features are extracted from each of the ambient image and the intensity image of the A-I image.

In one form, the method includes generating an ambient image and an intensity image based one the 3D point cloud data. The A-I image includes the ambient image and the intensity image.

In another form, the camera image and the A-I image are indicative of an uncontrolled environment outside of the vehicle.

In one form, the present disclosure provides a system for calibrating an image sensor pair including a camera sensor and a single photon avalanche diode (SPAD) light detection and range (LiDAR) sensor provided. The camera sensor and the SPAD LiDAR sensor being at a vehicle. The system includes one or more processors and one or more nontransitory computer-readable mediums storing instructions that are executable by the one or more processors. The instructions include extracting one or more identified features in each of a selected camera image and an ambient-intensity (A-I) image, wherein the selected camera image is provided by the camera sensor and the A-I image is provided by the SPAD LiDAR sensor. The instructions include generating a set of keypoints based on the one or more identified features extracted for each of the selected camera image and the A-I image. Each keypoint of the set of keypoints provides a pixel location and an image feature identified from among the one or more identified features at the pixel location for a respective image. The set of keypoints for the selected camera image is referred to as a set of two-dimensional (2D) camera keypoint locations and the set of keypoints for the A-I image is referred to as a set of 2D A-I keypoint locations. The instructions include determining one or more matched keypoints based on the set of 2D A-I keypoint locations and the set of 2D camera keypoint locations to provide a set of 2D A-I matched pixel locations and a set of 2D camera matched pixel locations. The set of 2D A-I matched pixel locations and the set of 2D camera matched pixel locations provide a pixel location of the one or more matched keypoints, respectively. The instructions include interpolating a three-dimensional (3D) point cloud data with the set of 2D A-I matched pixel locations to obtain a set of 3D LiDAR matched pixel locations based on a 2D-3D correlation data, wherein the 3D point cloud data is provided by the SPAD LiDAR. The instructions include determining and storing a set of extrinsic parameters to transform the set of 3D LiDAR matched pixel locations with the set of 2D camera matched pixel locations based on a pixel distance threshold.

In one form, the instructions further include pairing the selected camera image with the A-I image based on a camera timestamp associated with the selected camera image and a SPAD LiDAR timestamp associated with the A-I image.

In another form, the instructions for pairing the selected camera image with the A-I image further include comparing camera timestamps of a plurality of camera images from the camera sensor with the SPAD LiDAR timestamp of the A-I image. In one form, the instructions further include selecting, from the plurality of camera images, a camera image having a camera timestamp that is closest in time to the SPAD LiDAR timestamp associated with the A-I image, as the selected camera image.

In one form, the A-I image includes: an ambient image and an intensity image, and the one or more identified features are extracted from each of the ambient image and the intensity image of the A-I image; and the set of 2D A-I keypoint locations includes keypoints for the one or more identified features extracted from each of the ambient image and the intensity image.

In some forms, the instructions for determining the set of extrinsic parameters further includes: determining whether a keypoint pixel offset is less than a pixel distance threshold, wherein the keypoint pixel offset is indicative of a distance between pixel locations of a selected matched keypoint provided in the set of 3D LiDAR matched pixel locations and the set of 2D camera matched pixel locations; and obtaining an updated camera image and an updated A-I image in response to the keypoint pixel offset being greater than the pixel distance threshold. The extrinsic parameters are stored in response to the keypoint pixel offset being less than the pixel distance threshold.

In one form, the vehicle includes a plurality of camera sensors and a plurality of SPAD LiDAR sensors. The instructions further include determining whether a field of view of a selected camera from among the plurality of cameras overlaps with a field of view of a selected SPAD LiDAR from among the plurality of SPAD LiDAR. The instructions further include providing the selected camera and the selected SPAD LiDAR as the image sensor pair to be calibrated in response to the field of view of the selected camera and the field of view of the SPAD LiDAR overlapping.

In another form, the one or more identified features extracted are indicative of a shaped edge, a shaped contour, a predetermined classification of known objects, a corner of an object, or a combination thereof.

In one form, the instructions further include generating an ambient image and an intensity image based one the 3D point cloud data. The A-I image includes the ambient image and the intensity image.

In some forms, the camera image and the A-I image are indicative of an uncontrolled environment outside of the vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
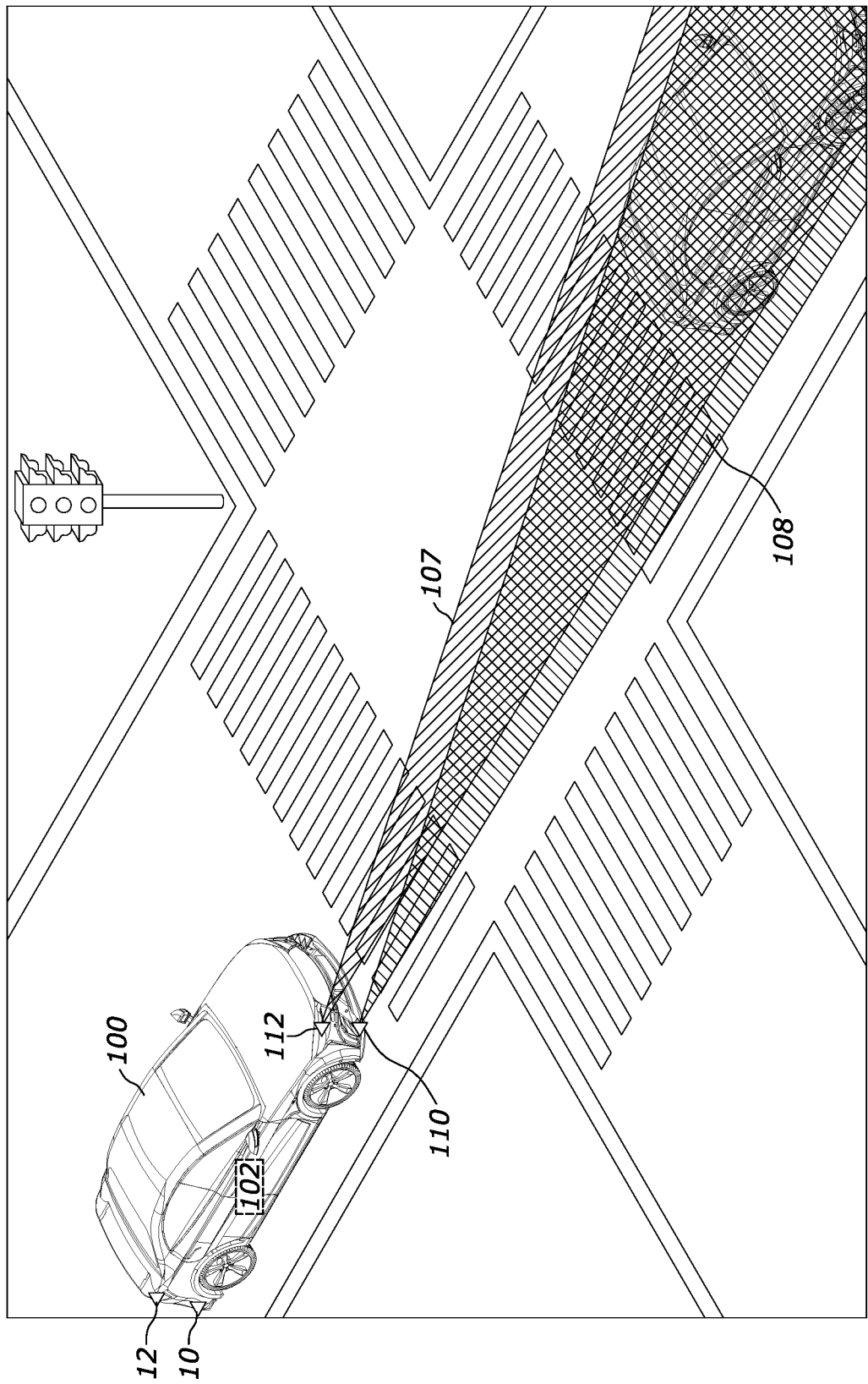
FIG. 1 is an environmental view of a vehicle having an image calibration system, according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure relates to systems and methods for calibrating one or more extrinsic parameters of an image sensor pair including a camera sensor and a single photon avalanche diode (SPAD) light detection and range (LiDAR) sensor. As described further below, the method includes determining a set of extrinsic parameters between the camera sensor and the SPAD LiDAR sensor to have an offset distance value less than a defined threshold. The set of extrinsic parameters are determined based on three-dimensional (3D) point cloud data, an ambient image, an intensity image, and a camera image. The offset distance is defined as one or more pixel location differences between a set of camera pixel locations and a set of 2D pixel locations of the 3D point cloud from the SPAD LiDAR sensor. In one form, the calibration of the camera sensor and the SPAD LiDAR sensor can be performed in a stopped and moving environment relative to a pose between the camera sensor and SPAD LiDAR sensor. That is, the camera image and the A-I image may of an uncontrolled environment outside of the vehicle in lieu of a highly controlled calibration setup. In the following, the camera sensor may be provided simply as "camera" and the SPAD LiDAR sensor may be provided simply as "SPAD LiDAR."

Referring now to FIG. 1, an example vehicle 100 having autonomous driving and/or semi-autonomous capabilities is shown. For example, the vehicle 100 is configured to control one or more vehicle functions including, but not limited to, braking, steering, acceleration, transmission (i.e., gear shifting), in accordance with signals received from one or more sensing devices, such as, but not limited to: cameras, SPAD LiDARs, lasers. In one form, the vehicle 100 includes one or more systems including, but not limited to, an engine, transmission, wheels, and brakes. In some examples, the vehicle 100 may be an electric or hybrid electric vehicle including a motor (not shown), and the engine (not shown) may be omitted.

In one form, the vehicle 100 includes an image calibration system 102 configured to perform an extrinsic calibration process on a pair of image sensors available on the vehicle 100. For example, the vehicle 100 includes at least one camera sensor 110 and at least one SPAD LiDAR sensor 112 arranged on the vehicle to capture images of the environment external to the vehicle 100. Data from the images can be used by controllers within the vehicle 100 for various operations, such as but not limited to: object detection, travel lane control, and adaptive cruise control. As described herein, the image calibration system 102 is configured to calibrate a selected camera and a selected SPAD LiDAR sensor that form an image sensor pair to correlate and align the images provided by the sensors.

In one form, the camera sensor 110 is configured to generate one or more camera image(s) of the environment in which the vehicle 100 is traveling. For example, FIG. 1 illustrates the vehicle 100 having one camera mounted at a rear portion of the vehicle 100 to capture environment images behind the vehicle and another camera 110 at a front portion of the vehicle 100 to capture environment images in front of the vehicle. In one form, the camera sensor 110 includes a camera reference clock (not shown) that can be synchronized with other image sensors. In one form, each camera image is associated with a camera time stamp based on a time of the camera reference clock to indicate a time that the camera image was captured by the camera sensor 110. In one example, the camera sensor 110 include a color camera and produces one or more red-green-blue (RGB) images (e.g., colored images). In addition, the camera sensor 110 may be a two-dimensional (2D) camera providing 2D images or a three-dimensional (3D) camera providing 3D images. If the vehicle 100 includes multiples cameras 110, the cameras may be a combination of the 2D and 3D camera, or just one type of camera (i.e., only 2D or only 3D cameras). In the following, the term "camera image data" may generally be used to refer to data indicative of the camera image and can include data indicative of the time stamp.

In one form SPAD LiDAR sensor 112 is configured to generate image data provided as a SPAD LiDAR stream that is indicative of a three-dimensional (3D) point cloud of the environment and an associated SPAD LiDAR time stamp. In one form and as known in the art, the SPAD LiDAR sensor 112 may spin or move about an axis such that a laser emits a short pulse of light towards a scene within an environment and light reflected from objects within the environment are captured by a detector. The laser beams are emitted into the environment and from a fixed azimuth (or horizontal) and elevation (i.e., vertical) angles. Single-photon avalanche diodes (SPAD) (not shown) of the SPAD LiDAR are provided to as detectors to measure energy of the reflected light. As known, the SPAD LiDAR 112 is configured to measure a distance to an object by detecting the time of flight of light transmitted until it returns to the SPAD LiDAR sensor 112 after being reflected by the object. In an example application, the SPAD LiDAR sensor 112 includes a frame rate (e.g., 10 fps, 300 kfps, among others), and an array size (e.g., 32×32 pixels, among others). In addition to the 3D point cloud data, the image data from the SPAD LiDAR 112 is indicative of and is used to provide an ambient image and an intensity image (collectively referred to as "ambient-intensity image"). In one form, as known, the SPAD LiDAR sensor 112 provides image data regarding two types of photons: (1) ambient photons that is representative of the ambient light reflected by the object; and (2) signal photons that is representative of return signal(s) that are reflected laser beams of K-different echoes. Accordingly, the SPAD LiDAR sensor 112 is configured to use the photon data to construct the ambient and intensity images. In the following, the term "SPAD LiDAR image data" is generally used to refer to the 3D point cloud data and the ambient-intensity image.

In one form, the SPAD LiDAR sensor 112 includes a LiDAR reference clock (not shown) that can be synchronized with other image sensors. In one form, the SPAD LiDAR image data is associated with a SPAD LiDAR time stamp based on a time of the LiDAR reference clock to indicate a time that the SPAD LiDAR image data was captured by the SPAD LiDAR sensor 112. In an example, application the camera reference clock and the LiDAR reference clock are synced in time with one another.

To form an image sensor pair, the camera 110 and the SPAD LiDAR 112 are arranged relative to one another such that a field of view of the camera 110 overlaps by a defined amount with a field of the SPAD LiDAR 112. Referring to FIG. 1, located near or about the front of the vehicle, the SPAD LiDAR sensor 112 is shown projecting an example a LiDAR field of view 107 and the camera sensor 110 is shown projecting a camera field of view 108. Accordingly, the SPAD LiDAR sensor 112 and the camera 110, which are positioned in proximity to one another, may form an image sensor pair. While FIG. 1 illustrates cameras 110 and SPAD LiDARs 112 at the front and rear, the vehicle 100 can include any number of cameras and SPAD LiDARs. For example, the front portion of the vehicle 100 may include two cameras 110 and one SPAD LiDAR 112. In addition, the location of the image sensors should not be limited to the front and rear portion. For example, camera(s) 110 and SPAD LiDAR 112 may be provided at the side of the vehicle 100 or even on a roof of the vehicle 100.

Figure 2:
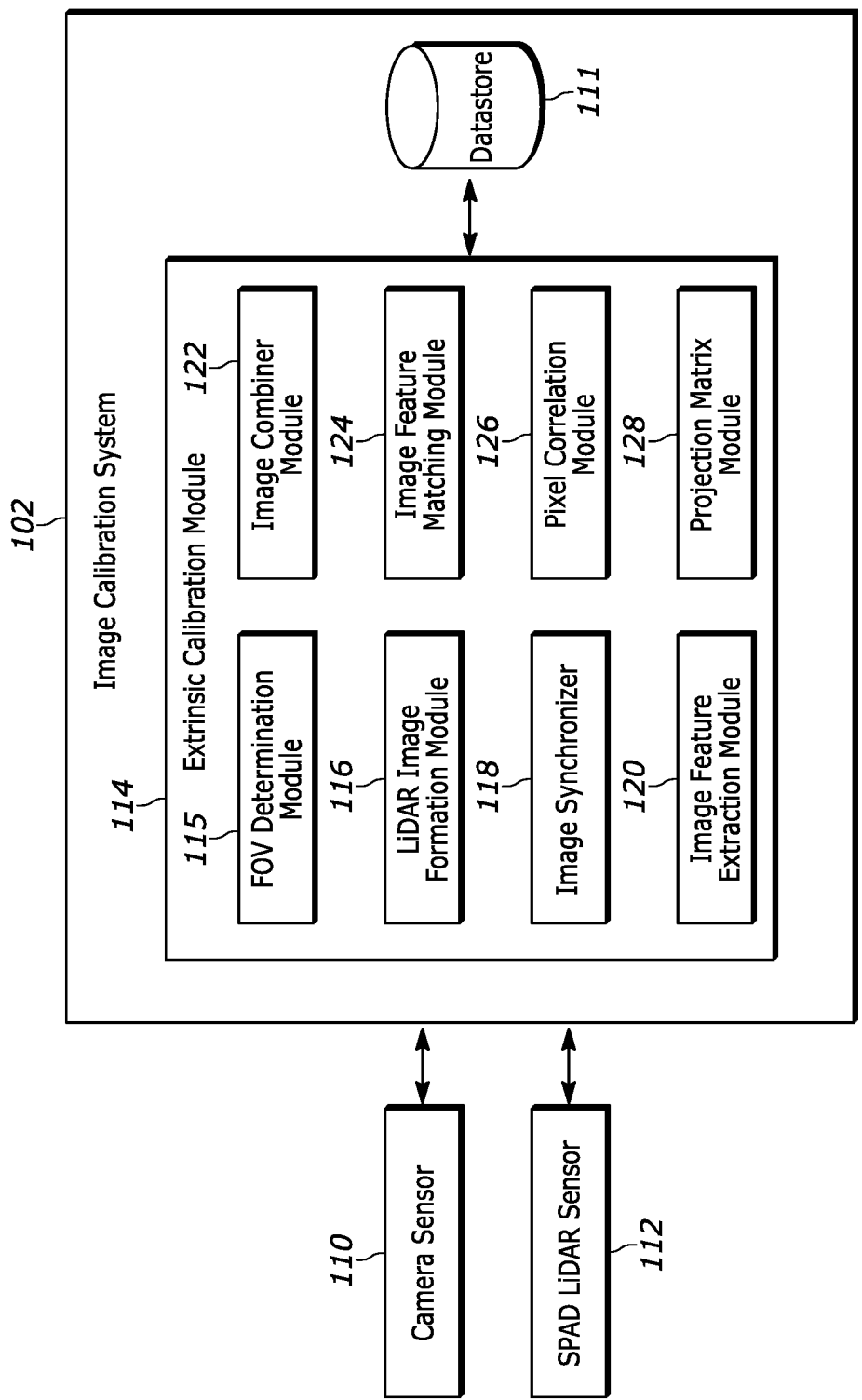
FIG. 2 is a block diagram of the image calibration system of FIG. 1, according to the teachings of the present disclosure.

In one form, the image calibration system 102 is provided at the vehicle 100 as a controller. In addition, the image calibration system 102 is communicably coupled to the camera sensor 110 and the SPAD LiDAR sensor 112 via a vehicle communication network that might be a wired and/or wireless communication network. Referring to FIG. 2, in one form, the image calibration system 102 includes an extrinsic calibration module 114, and a datastore 111.

In one form, the datastore 111 stores information employed by and generated by the extrinsic calibration module 114. For example, the datastore may store a set of extrinsic parameters determined by the extrinsic calibration module 114 for each image sensor pair. In one form, as known in the art, the set of extrinsic parameters is defined by rotation matrix and translation vector, and may also be referred to as a projection parameter.

Referring to FIG. 2, in one form, the extrinsic calibration module 114 is configured to include a field of view (FOV) determination module 115, an optional LiDAR image formation module 116, an image synchronizer module 118, an image feature extraction module 120, an image combiner module 122, an image feature matching module 124, a pixel correlation module 126, and a projection matrix module 128. In one form, the FOV determination module 115 is configured to determine whether a selected SPAD LiDAR sensor can be paired with a selected camera sensor. In one form, the FOV determination module 115 is configured to determine whether the field of views for the respectively selected SPAD LiDAR sensor 112 and the camera sensor 110 overlap. In an example application, the FOV determination module 115 retrieves predefined data indicative the field of view for each of the selected camera sensor 110 and the selected SPAD LiDAR 112 from the datastore. In another example, the FOV determination module 115 is configured to use image data from the camera sensor 110 and the SPAD LiDAR 112 to determine if the field of view overlap by identifying one or more common features. If the field of views overlap by a predefined amount, the FOV determination module 115 provides the selected camera 110 and the selected SPAD LiDAR 112 as the image sensor pair to be calibrated. If the vehicle includes multiple sensor cameras and/or multiple SPAD LiDARs, the FOV determination module 115 is configured to select different camera sensor and SPAD LiDAR sensor pair to assess of the sensors can form the image sensor pair for calibration.

Figure 3:
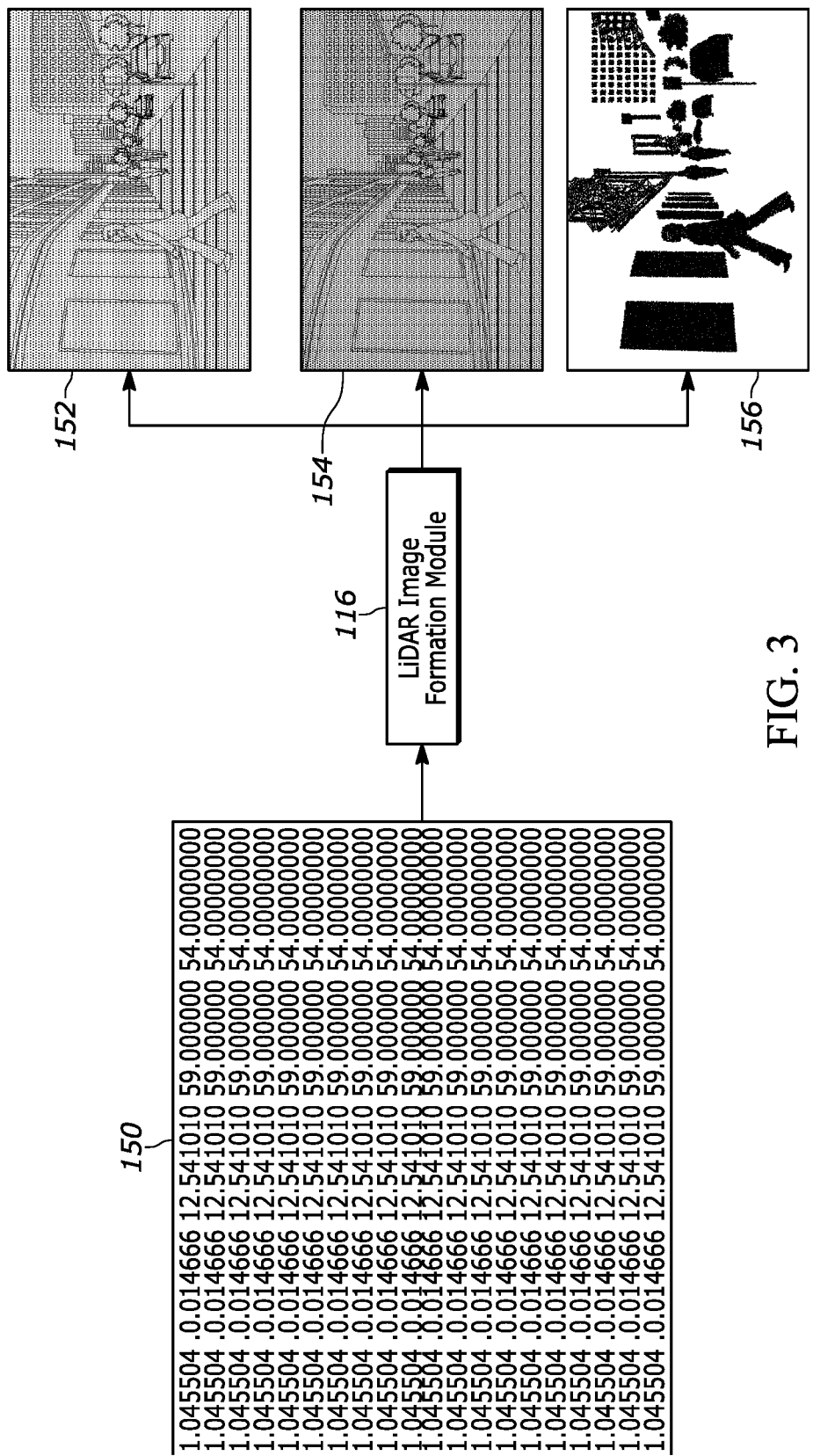
FIG. 3 is an illustrative diagram of a SPAD LiDAR stream converted into an ambient image, an intensity image, and three-dimensional (3D) point cloud data, according to the teachings of the present disclosure.

Referring to FIGS. 3, the LiDAR image formation module 116 is configured to receive the SPAD LiDAR image data to define the 3D point cloud, an ambient image, and an intensity image. For example, FIG. 3 illustrates an example SPAD LiDAR image data 150 that is used to generate an ambient image 152, an intensity image 154, and a 3D point cloud 156. In one form, the image data 150 includes a set of 3D coordinate points (i.e., sets of X, Y, and Z points), intensity points, and ambient points. The X, Y, Z points represent the position of a point in a 3D space relative to the SPAD LiDAR sensor 112. The intensity points represent the reflectivity detected at a selected point, where the selected point is likely an object from which light is reflected. The ambient points represent ambient light detected at the selected point. Accordingly, the LiDAR image formation module 116 is configured to construct the 3D point cloud 156, the ambient image 152, and the intensity image 119 based on the 3D coordinate points, the intensity points, and the ambient points. Alternatively, the image calibration system 102 may not have the LiDAR image formation module 116 if the SPAD LiDAR 112 provides the 3D point cloud 156, the intensity image 154, and the ambient image 152 to the image calibration system 102.

Figure 4:
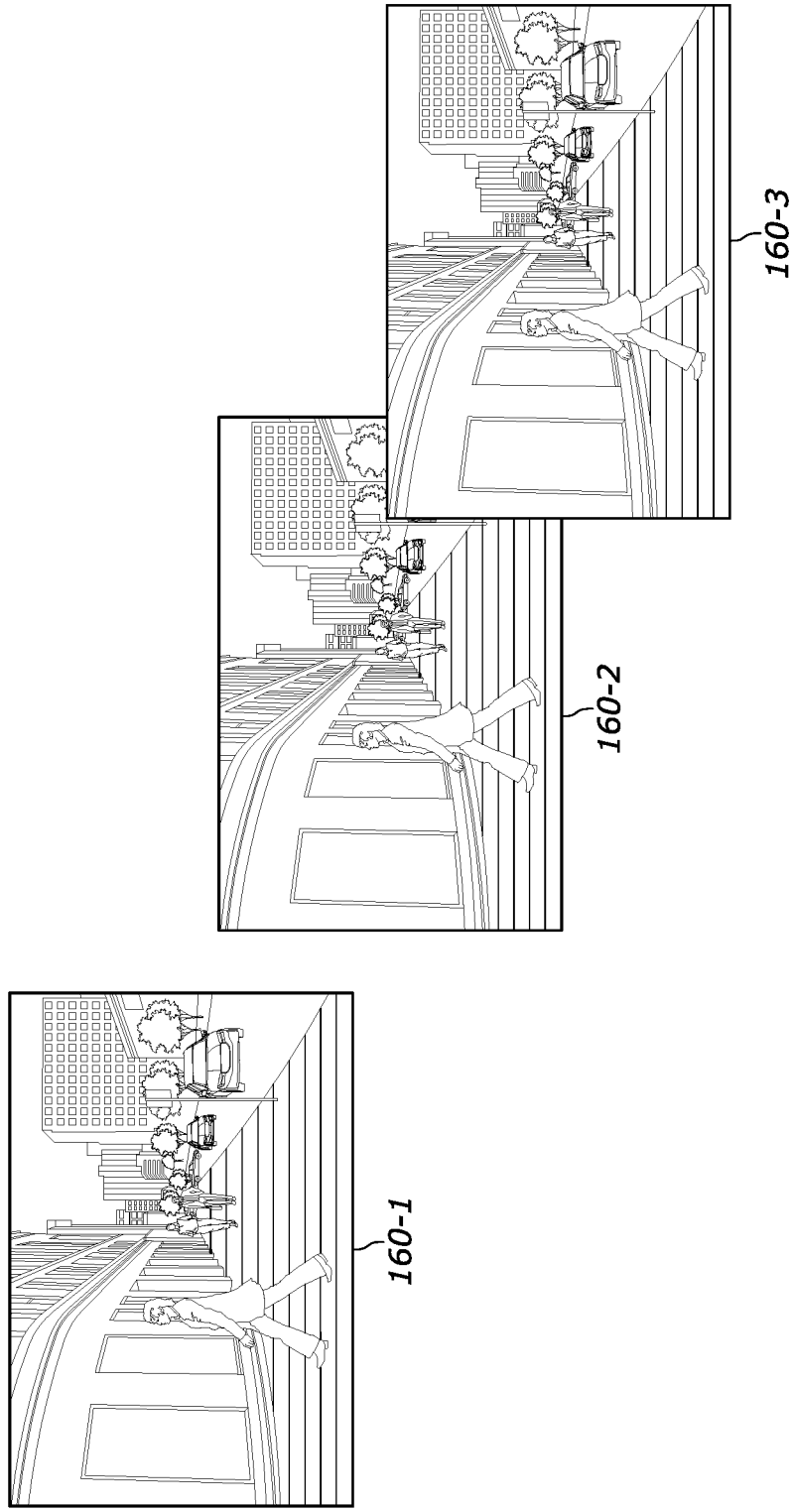
FIG. 4 is an illustrative diagram of a plurality of camera images, according to the teaching of the present disclosure.

Referring to FIG. 2, in one form, the image synchronizer module 118 is configured to obtain camera image(s) and the ambient-intensity image(s) and select images that are associated in time. More particularly, the camera 110 and the SPAD LiDAR sensor 112 may output images at different framerates, and thus, the images may not be synchronized. In one form, the image synchronizer module 118 selects a sensor of the image sensor pair having a lowest frame rate as the anchor sensor. For each image generated by the anchor sensor, the image synchronizer module 118 selects an image from the other sensor of the image sensor pair that has a respective time stamp nearest in time to the image from the anchor sensor. For example, if the SPAD LiDAR sensor 112 has a slower framerate than that of the camera 110, the image synchronizer module 118 selects the SPAD LiDAR sensor 112 as the anchor sensor. Referring to FIG. 4, the camera sensor 110 outputs camera images 160-1, 160-2 and 160-3, and the timestamps of the camera images 160-1, 160-2, 160-3 are compared to that of the SPAD LiDAR sensor 112 (i.e., the timestamp of the camera image may be referred to as "camera timestamp" and the timestamp of the SPAD LiDAR sensor 112 may be referred to as "SPAD LiDAR timestamp"). The image synchronizer 118 is configured to select a camera image from among images 160-1, 160-2, and 160-3 that is closest in time to, for example, the A-I image 152, 154 of FIG. 3, as the selected camera image to be evaluated with the A-I image 152, 154. In one form, the image synchronizer module 118 discards any remaining cameras images. It should be readily understood that while the SPAD LiDAR 112 is provided as the anchor sensor, the image synchronizer module 118 may identify the camera 110 as the anchor sensor if the camera 110 has a lower framerate.

Figure 5A:
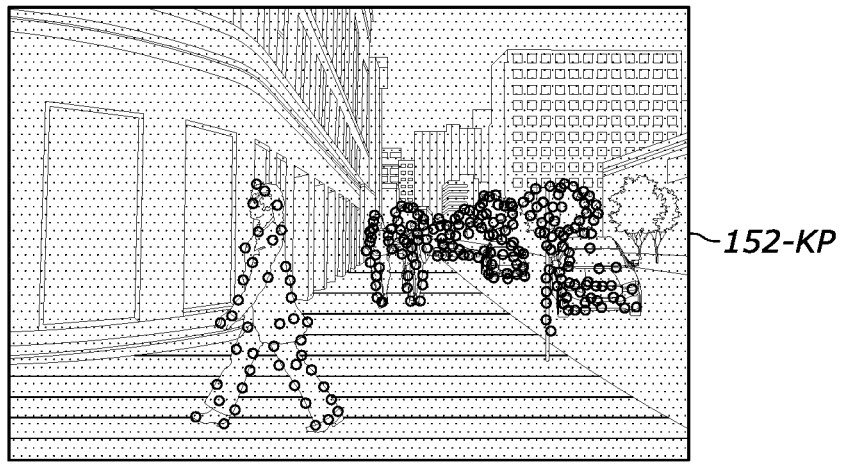
FIG. 5A is an illustrative diagram of a set of keypoints in the ambient image of FIG. 3, according to the teachings of the present disclosure.
Figure 5B:
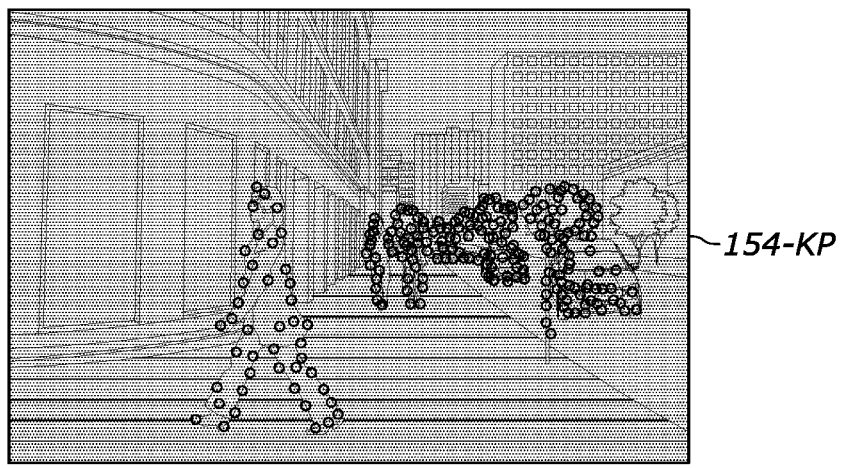
FIG. 5B is an illustrative diagram of a set of keypoints in the intensity image of FIG. 3, according to the teachings of the present disclosure.
Figure 5C:
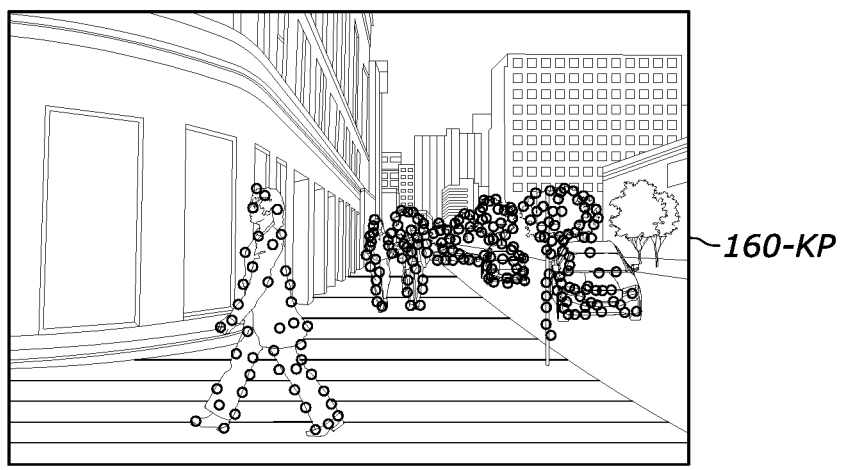
FIG. 5C is a set of keypoints in a camera image of the plurality of camera images of FIG. 4, according to the teachings of the present disclosure.

In one form, the image feature extraction module 120 is configured to extract one or more identified features in each of the selected camera image and the A-I image (i.e., specifically both the ambient and intensity images). The image feature extraction module 120 applies a feature extractor to each of the camera image and the A-I image to detect one or more identified features of an object in a respective image. The image feature extraction module 120 further generates a set of keypoints (e.g., a list of keypoints) based on the identified features extracted for each of the A-I image and the camera image. In one form, identified features are parts or patterns of an object in a respective image that assist to identify the object. For example, an identified feature may include a shaped edge, a shaped contour, a predetermined classification of known objects, a corner of an object, a ridge of an object, regions of interest points or a combination thereof. For example, referring to FIGS. 3, 4, and 5A to 5C, the ambient image 152, the intensity image, and the camera images 160 are for substantially the same environment or area. The ambient image 152 of FIG. 3 is provided in FIG. 5A as an ambient image 152-KP with keypoints identified therein; the intensity image 154 of FIG. 3 is provided in FIG. 5B as an intensity image 154-KP with keypoints identified therein; and the camera image 160-3 of FIG. 4 is provided in FIG. 5C as a camera image 160-KP with keypoints identified therein. In FIGS. 5A, 5B, and 5C the keypoints are generally represented by circles. In one form, the image feature extraction module 120 is configured to employ a known feature extractor image processing technique for feature extraction such as, but not limited to, scale-invariant feature transformation (SIFT), Harris corner detection (HCD), speeded-up robust features (SURF), and oriented FAST (i.e., "FAST" is features from accelerated segment test) and rotated BRIEF (i.e., "BRIEF" is binary robust independent elementary features) (ORB).

In one form, each keypoint of the set of keypoints provides a pixel location and an image feature identified from among the identified features at the pixel location for respective images. The set of keypoints for the selected camera image is referred to as a set of two-dimensional (2D) camera keypoint locations and the set of keypoints for the A-I image is referred to as 2D A-I keypoint locations. With respect to A-I image keypoints, the image feature extraction module 120 generates keypoints in the ambient image (i.e., ambient image keypoints) and keypoints in the intensity image (i.e., intensity image keypoints), which are then combined to provide the 2D A-I keypoint locations.

Figure 6:
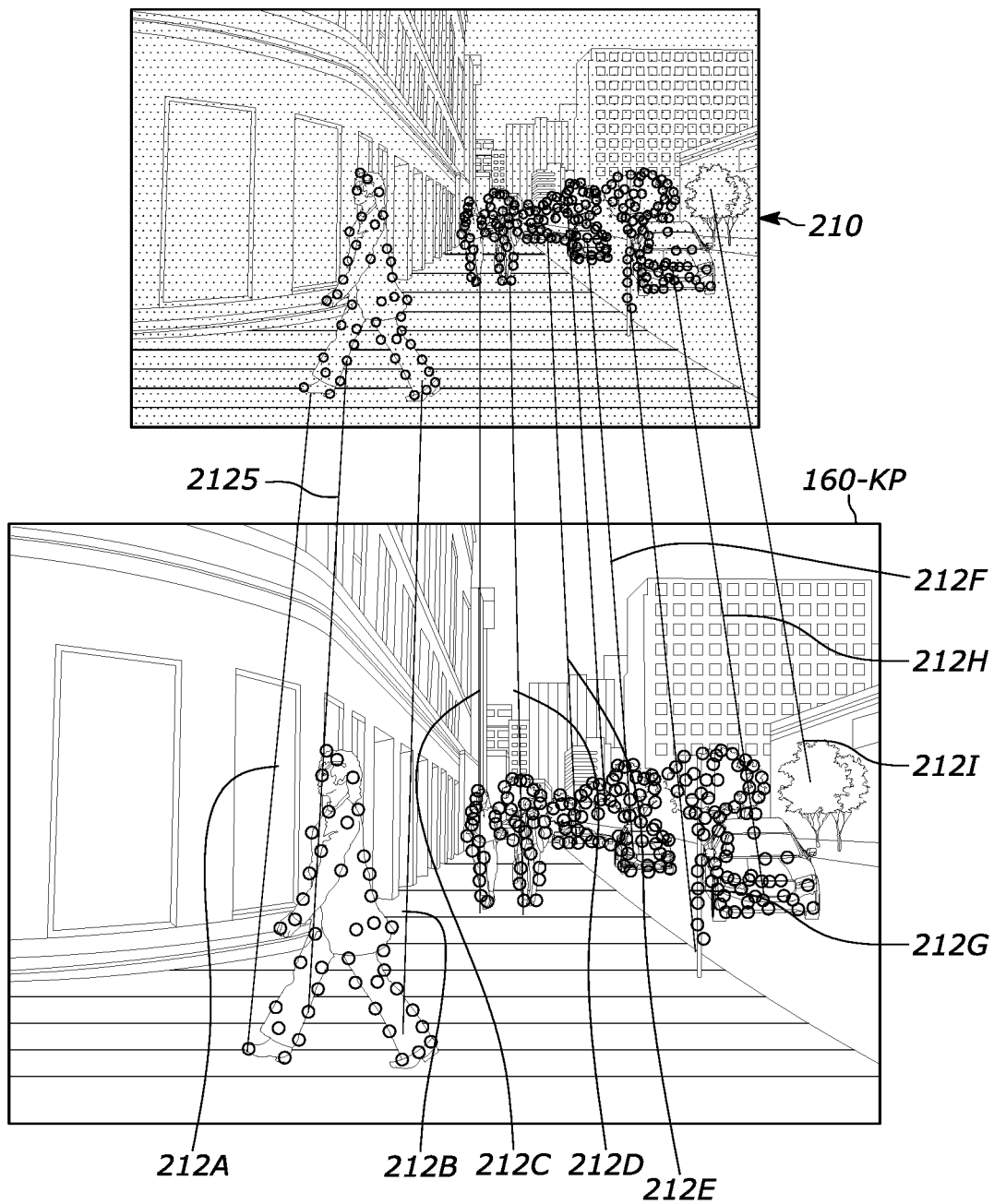
FIG. 6 is an illustrative matching diagram of combined SPAD LiDAR keypoints in a SPAD LiDAR image to the set of keypoints in the camera image, according to the teachings of the present disclosure.

More particularly, in one form, the image combiner module 122 is configured to receive the ambient image keypoints and the intensity image keypoint to form the A-I keypoints, which may be referred to as combined LiDAR keypoints. At times, ambient images may need a certain amount of sunlight to produce proper images. For example, if the sunlight is too bright, the ambient image could be saturated, and alternatively, if there is not enough sunlight, the ambient image could be dark. In either situation, features may not be able to be extracted. In addition, in intensity images, the intensity values are indicative of the reflectivity of a surface of the object. Accordingly, if the environment does not have reflective objects, then no features can be extracted from the intensity images. The quality of the intensity image is not dependent on the sunlight, thus, to improve calibration of the extrinsic parameter, the image combiner module 122 combines the ambient image keypoints and the intensity image keypoints to provide the combined LiDAR keypoints. That is, in one form, image combiner module 122 is configured to overlay the ambient image having the keypoints with the intensity image having the keypoints to define a LiDAR keypoint image, which may also be thought as the A-I image. The ambient image and intensity image generally have similar shape and look at same pixel, and thus, overlaying and combining the keypoints should not create a pixel mismatch. For example, FIG. 6 illustrates a LiDAR keypoint image 210 in which the ambient image 152-KP of FIG. 5A and the intensity image 154-KP of FIG. 5B are overlayed, with the combined LiDAR keypoints 210 generally represented with circles. With the keypoints, the image combiner module 122 is configured to provide 2D A-I keypoint locations.

In one form, the image feature matching module 124 is configured to determine one or more matched keypoints based on the set of 2D A-I keypoint locations and the set of 2D camera keypoint locations to obtain a pixel correlation between the LiDAR keypoint image and the camera image having the keypoints. For example, in FIG. 6, lines 212A to 212I generally identify matching features between the LiDAR keypoint image 210 and the camera image 160-KP of FIG. 5C. Based on the one or more matched keypoints, the image feature matching module 124 provides a set of 2D A-I matched pixel locations and a set of 2D camera matched pixel locations. The set of 2D A-I matched pixel locations and the set of 2D camera matched pixel locations provide a pixel location of the one or more matched keypoints provided in the LiDAR keypoint image, which is based on the A-I image, and the selected camera image, respectively. The image feature matching module 124 may employ known feature matching techniques such as, but not limited to, Brute-Force matcher, FLANN matcher (i.e., "FLANN" is fast library for approximate nearest neighbors), and KNN matcher (i.e., "KNN" is K-nearest neighbor). In one form, the image feature matching employs a machine learning algorithm to obtain the pixel correlation between the LiDAR image and the camera image.

Figure 7:
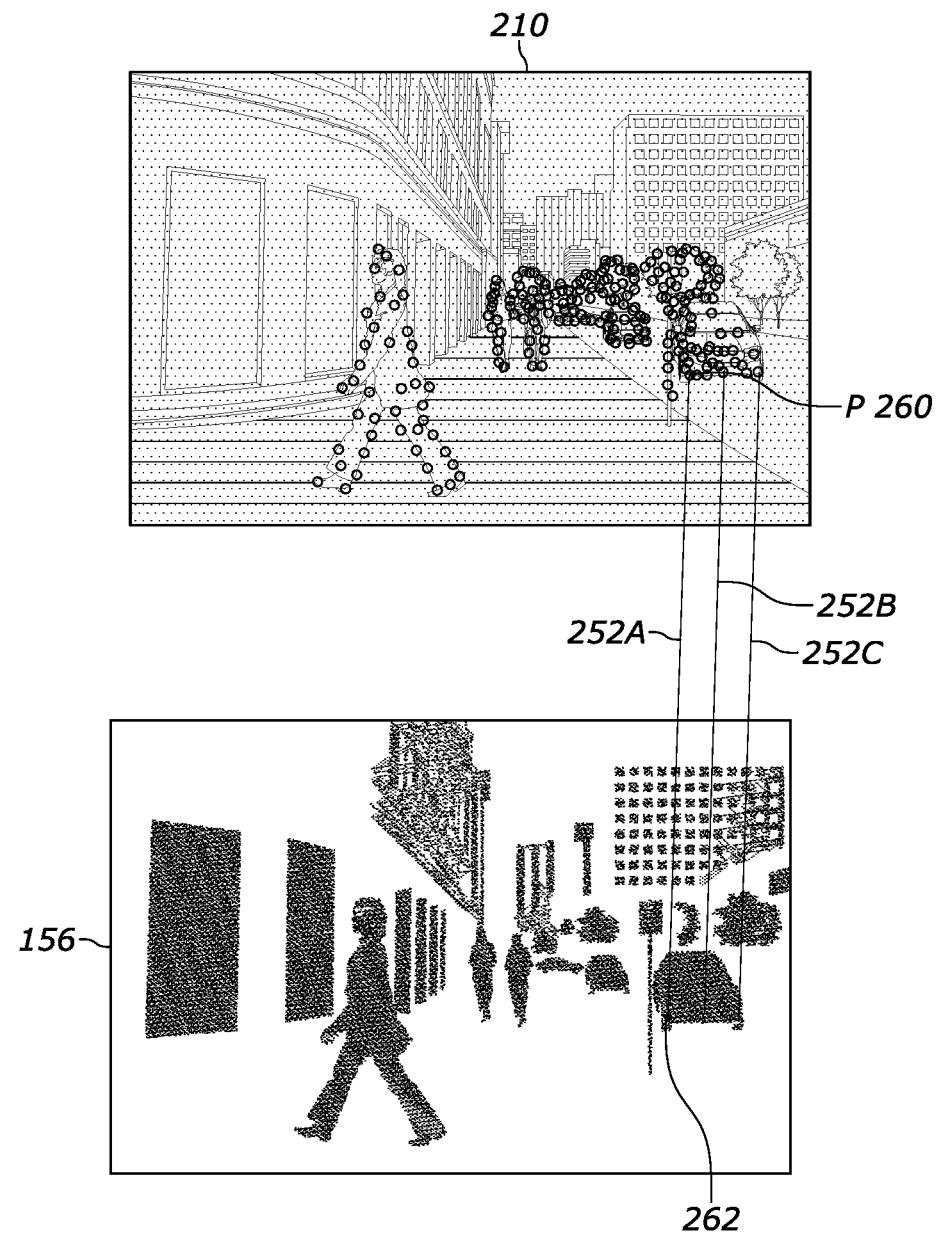
FIG. 7 is an illustrative mapping diagram of a set of 2D pixel locations in the SPAD LiDAR image and the 3D point cloud data, according to the teachings of the present disclosure.

In one form, the pixel correlation module 126 is configured to interpolate the 3D point cloud data to the set of 2D A-I matched pixel locations to obtain a set of 3D LiDAR matched pixel locations based on a 2D-3D correlation data. In one form, the 2D-3D correlation data is predefined, and maps 2D pixel locations of an A-I image with the 3D point cloud. Accordingly, the pixel correlation module 126 employs the 2D-3D correlation data to determine a corresponding 3D point in the 3D point cloud data for each pixel of the set of A-I pixel locations identified as being a keypoint. For example, FIG. 7 illustrates the LiDAR keypoint image 210 and the 3D point cloud 156, where lines 252A, 252B, and 252C illustrate correlation between features of the LiDAR keypoint image 210, which is a 2D image, to respective points/features in the 3D point cloud. As shown in FIG. 7 and assuming row-major order, a pixel location referenced with number 260 has a 2D location of 30,50 and corresponds to a 3D point referenced with number 262, which is at index 1500. In one form, the pixel correlation module 126 is configured to generate the set of 2D A-I pixel locations based on keypoints identified in the combined LiDAR image 210 as shown in FIG. 7. In another form, the pixel correlation module 126 is configured to generate the set of 2D A-I pixel locations based on keypoints identified in the ambient image 152-KP.

In one form, the projection matrix module 128 is configured to determine a set of extrinsic parameters to transform the set of 3D LiDAR matched pixel locations with the set of 2D camera matched pixel locations based on a pixel distance threshold. Specifically, the set of 3D LiDAR matched pixel locations provide 3D points of keypoints in a world coordinate that match and correspond to keypoints of the set of 2D camera matched pixel locations. Accordingly, the projection matrix module 128 estimates a projection matrix further defined by a rotation matrix and a translation vector, as the set of extrinsic parameters, transforms 3D points of the SPAD Lidar to 2D pixel from the camera sensor 110. In one form, the set of extrinsic parameters are defined such that, when used to transform the 3D points to 2D pixels, the amount of error associated with a camera image taken during normal operation is at a nominal threshold (i.e., the nominal threshold is based on the pixel distance threshold.

Figure 8:
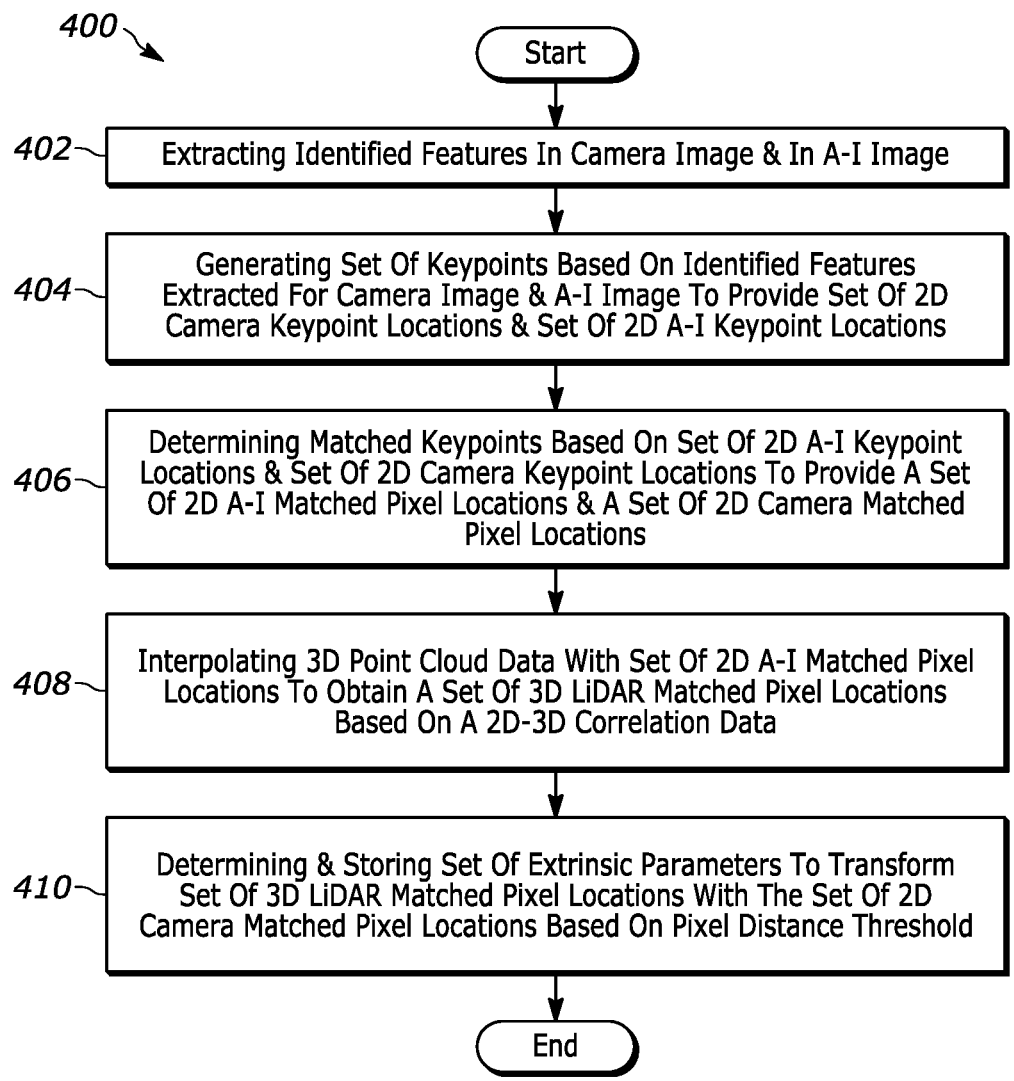
FIG. 8 is a flowchart for a method of calibrating extrinsic parameter for a pair of camera-LiDAR sensors, according to the teaching of the present discourse.

For example, in one form, in determining the set of extrinsic parameters, the projection matrix module 128 is configured to determine whether a keypoint pixel offset is less than a pixel distance threshold, where the keypoint pixel offset is indicative of a distance between pixel locations of a selected matched keypoint provided in the set of 3D LiDAR matched pixel locations and the set of 2D camera matched pixel locations. If the keypoint pixel offset is less than the pixel distance threshold, the set of extrinsic parameters are saved for the image sensor pair in the datastore 111. As known in the art, the stored set of extrinsic parameters are employed during normal operation of the camera sensor 110 and the SPAD LiDAR sensor 112, which generally includes providing images to other controllers within the vehicle to, for example, detect objects above the vehicle, detect road markers (drive lanes), perform adaptive cruise controller, among other operations. Conversely, the keypoint pixel offset being greater than the pixel distance threshold, the projection matrix module 128 is configured to request new or updated camera image and A-I image from the camera sensor 110 and the SPAD LiDAR sensor 112, respectively. In one form, in obtaining the new images, operation settings of the camera sensor 110 and/or SPAD LiDAR sensor 112 can be adjusted. For example, the focus of the camera sensor 110 may be adjusted, and with the new updated image, the calibration is performed again by the extrinsic calibration module. In one form, the projection matrix module 128 is configured to employ known optimization techniques, such as but not limited to: a simple liner least squares, iterative stochastic gradient, machine learning, or an ADAM optimizer With reference to FIG. 8, a flowchart illustrating an example calibration routine performed by the image calibration system 102, where details of various step are set forth above. In this example, the routine 400 begins after a camera image is selected from among multiple images in accordance with the description above. At 402, the image calibration system 102 extracts one or more identified features in each of the selected camera image and the A-I image, which includes the ambient image and intensity image. At 404, the image calibration system 102 generates a set of keypoints based on identified features extracted for the camera image and the A-I image. As described above, each keypoint of the set of keypoints provides a pixel location and an image feature identified at the pixel location for respective image. The set of keypoints for the selected camera image is referred to as a set of 2D camera keypoint locations and the set of keypoints for the A-I image is referred to as a set of 2D A-I keypoint locations. At 406, the image calibration system 102 determines one or more matched keypoints based on the set of 2D A-I keypoint locations and the set of 2D camera keypoint locations to provide a set of 2D A-I matched pixel locations and a set of 2D camera matched pixel locations. The set of 2D A-I matched pixel locations and the set of 2D camera matched pixel locations provide a pixel location of the one or more matched keypoints for respective images. At 408, the image calibration system 102 interpolates the 3D point cloud data with the set of 2D A-I matched pixel locations to obtain a set of 3D LiDAR matched pixel locations based on a 2D-3D correlation data. At 410, the image calibration system 102 is configured to determine and store set of extrinsic parameters to transform the set of 3D LiDAR matched pixel locations with the set of 2D camera matched pixel locations based on a pixel distance threshold.

As described herein, the image calibration system of the present disclosure is configured to calibrate an image sensor pair, including a camera and a SPAD-LiDAR, using both ambient and intensity images. The image calibration system is not required to be in a controlled setting or use special calibration tools. image calibration system. With the camera(s) and SPAD LiDAR sensor(s) provided on the vehicle, the image calibration system can perform the calibration of the extrinsic parameters just using the environment around the vehicle.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of calibrating an image sensor pair including a camera sensor and a single photon avalanche diode (SPAD) light detection and range (LiDAR) sensor provided, the camera sensor and the SPAD LiDAR sensor being at a vehicle, the method comprising:
   extracting one or more identified features in each of a selected camera image and an ambient-intensity (A-I) image, wherein the selected camera image is provided by the camera sensor and the A-I image is provided by the SPAD LiDAR sensor;
   generating a set of keypoints based on the one or more identified features extracted for each of the selected camera image and the A-I image,
      wherein each keypoint of the set of keypoints provides a pixel location and an image feature identified from among the one or more identified features at the pixel location for a respective image,
      wherein the set of keypoints for the selected camera image is referred to as a set of two-dimensional (2D) camera keypoint locations and the set of keypoints for the A-I image is referred to as a set of 2D A-I keypoint locations;
   determining one or more matched keypoints based on the set of 2D A-I keypoint locations and the set of 2D camera keypoint locations to provide a set of 2D A-I matched pixel locations and a set of 2D camera matched pixel locations, wherein the set of 2D A-I matched pixel locations and the set of 2D camera matched pixel locations provide a pixel location of the one or more matched keypoints respectively;
   interpolating a three-dimensional (3D) point cloud data with the set of 2D A-I matched pixel locations to obtain a set of 3D LiDAR matched pixel locations based on a 2D-3D correlation data, wherein the 3D point cloud data is provided by the SPAD LiDAR; and
   determining and storing a set of extrinsic parameters to transform the set of 3D LiDAR matched pixel locations with the set of 2D camera matched pixel locations based on a pixel distance threshold.

2. The method of claim 1 further comprising having the camera sensor and the SPAD LiDAR sensor synchronized to a common reference clock.

3. The method of claim 1 further comprising pairing the selected camera image with the A-I image based on a camera timestamp associated with the selected camera image and a SPAD LiDAR timestamp associated with the A-I image.

4. The method of claim 3, wherein pairing the selected camera image with the A-I image further comprises:
   comparing camera timestamps of a plurality of camera images from the camera sensor with the SPAD LiDAR timestamp of the A-I image; and
   selecting, from the plurality of camera images, a camera image having a camera timestamp that is closest in time to the SPAD LiDAR timestamp associated with the A-I image, as the selected camera image.

5. The method of claim 1, wherein:
   the A-I image includes an ambient image and an intensity image, and
   the set of 2D A-I keypoint locations includes one or more keypoints for each of the ambient image and the intensity image.

6. The method of claim 1, wherein determining the set of extrinsic parameters further comprises:
   determining whether a keypoint pixel offset is less than a pixel distance threshold, wherein the keypoint pixel offset is indicative of a distance between pixel locations of a selected matched keypoint provided in the set of 3D LiDAR matched pixel locations and the set of 2D camera matched pixel locations; and
   obtaining an updated camera image and an updated A-I image in response to the keypoint pixel offset being greater than the pixel distance threshold, wherein the extrinsic parameters is stored in response to the keypoint pixel offset being less than the pixel distance threshold.

7. The method of claim 1, wherein the vehicle includes a plurality of camera sensors and a plurality of SPAD LiDAR sensors, wherein the method further comprises:
   determining whether a field of view of a selected camera from among the plurality of cameras overlaps with a field of view of a selected SPAD LiDAR from among the plurality of SPAD LiDAR; and
   providing the selected camera and the selected SPAD LiDAR as the image sensor pair to be calibrated in response to the field of view of the selected camera and the field of view of the SPAD LiDAR overlapping.

8. The method of claim 1, wherein the one or more identified features extracted are indicative of a shaped edge, a shaped contour, a predetermined classification of known objects, a corner of an object, or a combination thereof.

9. The method of claim 1, wherein
   the A-I image include an ambient image and an intensity image, and
   the one or more identified features are extracted from each of the ambient image and the intensity image of the A-I image.

10. The method of claim 1 further comprising generating an ambient image and an intensity image based one the 3D point cloud data, wherein the A-I image includes the ambient image and the intensity image.

11. The method of claim 1, wherein the camera image and the A-I image are indicative of an uncontrolled environment outside of the vehicle.

12. A system for calibrating an image sensor pair including a camera sensor and a single photon avalanche diode (SPAD) light detection and range (LiDAR) sensor provided, the camera sensor and the SPAD LiDAR sensor being at a vehicle, the system comprising:
   one or more processors and one or more nontransitory computer-readable mediums storing instructions that are executable by the one or more processors, wherein the instructions comprise:
      extracting one or more identified features in each of a selected camera image and an ambient-intensity (A-I) image, wherein the selected camera image is provided by the camera sensor and the A-I image is provided by the SPAD LiDAR sensor;
      generating a set of keypoints based on the one or more identified features extracted for each of the selected camera image and the A-I image,
         wherein each keypoint of the set of keypoints provides a pixel location and an image feature identified from among the one or more identified features at the pixel location for a respective image,
wherein the set of keypoints for the selected camera image is referred to as a set of two-dimensional (2D) camera keypoint locations and the set of keypoints for the A-I image is referred to as a set of 2D A-I keypoint locations;
determining one or more matched keypoints based on the set of 2D A-I keypoint locations and the set of 2D camera keypoint locations to provide a set of 2D A-I matched pixel locations and a set of 2D camera matched pixel locations, wherein the set of 2D A-I matched pixel locations and the set of 2D camera matched pixel locations provide a pixel location of the one or more matched keypoints respectively;
interpolating a three-dimensional (3D) point cloud data with the set of 2D A-I matched pixel locations to obtain a set of 3D LiDAR matched pixel locations based on a 2D-3D correlation data, wherein the 3D point cloud data is provided by the SPAD LiDAR; and
determining and storing a set of extrinsic parameters to transform the set of 3D LiDAR matched pixel locations with the set of 2D camera matched pixel locations based on a pixel distance threshold.

13. The system of claim 12, wherein the instructions further comprise pairing the selected camera image with the A-I image based on a camera timestamp associated with the selected camera image and a SPAD LiDAR timestamp associated with the A-I image.

14. The system of claim 13, wherein instructions for pairing the selected camera image with the A-I image further comprises:
comparing camera timestamps of a plurality of camera images from the camera sensor with the SPAD LiDAR timestamp of the A-I image; and
selecting, from the plurality of camera images, a camera image having a camera timestamp that is closest in time to the SPAD LiDAR timestamp associated with the A-I image, as the selected camera image.

15. The system of claim 12, wherein:
the A-I image includes an ambient image and an intensity image, and
the one or more identified features are extracted from each of the ambient image and the intensity image of the A-I image; and the set of 2D A-I keypoint locations includes keypoints for the one or more identified features extracted from each of the ambient image and the intensity image.

16. The system of claim 12, wherein instructions for determining the set of extrinsic parameters further comprises:
determining whether a keypoint pixel offset is less than a pixel distance threshold, wherein the keypoint pixel offset is indicative of a distance between pixel locations of a selected matched keypoint provided in the set of 3D LiDAR matched pixel locations and the set of 2D camera matched pixel locations; and
obtaining an updated camera image and an updated A-I image in response to the keypoint pixel offset being greater than the pixel distance threshold, wherein the extrinsic parameters is stored in response to the keypoint pixel offset being less than the pixel distance threshold.

17. The system of claim 12, wherein:
the vehicle includes a plurality of camera sensors and a plurality of SPAD LiDAR sensors, and
the instructions further comprise:
determining whether a field of view of a selected camera from among the plurality of cameras overlaps with a field of view of a selected SPAD LiDAR from among the plurality of SPAD LiDAR; and
providing the selected camera and the selected SPAD LiDAR as the image sensor pair to be calibrated in response to the field of view of the selected camera and the field of view of the SPAD LiDAR overlapping.

18. The system of claim 12, wherein the one or more identified features extracted are indicative of a shaped edge, a shaped contour, a predetermined classification of known objects, a corner of an object, or a combination thereof.

19. The system of claim 12, wherein the instructions further comprise generating an ambient image and an intensity image based one the 3D point cloud data, wherein the A-I image includes the ambient image and the intensity image.

20. The system of claim 12, wherein the camera image and the A-I image are indicative of an uncontrolled environment outside of the vehicle.

* * * * *